(12) United States Patent
Putzig

(10) Patent No.: US 8,252,731 B2
(45) Date of Patent: Aug. 28, 2012

(54) SOLID ZIRCONIUM-BASED CROSS-LINKING AGENT AND USE IN OIL FIELD APPLICATIONS

(75) Inventor: Donald Edward Putzig, Newark, DE (US)

(73) Assignee: Dorf Ketal Speciality Catalysts, LLC, Stafford, TX (US)

( * ) Notice: Subject to any disclaimer, the term of this patent is extended or adjusted under 35 U.S.C. 154(b) by 0 days.

(21) Appl. No.: 13/243,652

(22) Filed: Sep. 23, 2011

(65) Prior Publication Data

US 2012/0012316 A1    Jan. 19, 2012

Related U.S. Application Data

(62) Division of application No. 11/986,093, filed on Nov. 20, 2007, now Pat. No. 8,044,001.

(51) Int. Cl.
| | |
|---|---|
| *C23F 11/18* | (2006.01) |
| *C09K 8/68* | (2006.01) |
| *E21B 33/00* | (2006.01) |
| *E21B 43/26* | (2006.01) |

(52) U.S. Cl. ........ 507/271; 507/209; 507/903; 166/285; 166/305.1; 166/308.1

(58) Field of Classification Search .................. 507/209, 507/271, 903; 166/308.1, 285, 305.1
See application file for complete search history.

(56) References Cited

U.S. PATENT DOCUMENTS

| | | | |
|---|---|---|---|
| 2,824,114 | A | 2/1958 | Bostwick |
| 4,477,360 | A | 10/1984 | Almond |
| 4,515,216 | A | 5/1985 | Childs et al. |
| 4,534,870 | A | 8/1985 | Williams |
| 4,578,488 | A | 3/1986 | Rummo et al. |
| 4,656,016 | A | 4/1987 | Taramasso et al. |
| 4,683,068 | A | 7/1987 | Kucera |
| 4,798,902 | A | 1/1989 | Putzig |
| 4,883,605 | A | 11/1989 | Putzig |
| 8,044,001 | B2 | 10/2011 | Putzig |
| 2006/0205605 | A1 | 9/2006 | Dessinges et al. |
| 2006/0281800 | A1 | 12/2006 | Kumar et al. |
| 2008/0149341 | A1 | 6/2008 | Putzig |

FOREIGN PATENT DOCUMENTS

EP    0109014 B1    7/1987

*Primary Examiner* — Ling Choi
*Assistant Examiner* — Aiqun Li
(74) *Attorney, Agent, or Firm* — Conley Rose, P.C.; Rodney B. Carroll

(57) ABSTRACT

A solid zirconium cross-linking agent is prepared comprising zirconium and hydroxyalkylated ethylene diamine ligand. Use of the cross-linking agent in compositions for oil field applications such as hydraulic fracturing and plugging of permeable zones is also disclosed.

20 Claims, No Drawings

SOLID ZIRCONIUM-BASED CROSS-LINKING AGENT AND USE IN OIL FIELD APPLICATIONS

CROSS-REFERENCE TO RELATED APPLICATIONS

This application is a divisional application of U.S. patent application Ser. No. 11/986,093, filed Nov. 20, 2007 and published as U.S. Application Publication No. 2009/0131284 A1, entitled "Solid Zirconium-Based Cross-Linking Agent and Use in Oil Field Applications," which is hereby incorporated herein by reference in its entirety for all purposes.

FIELD OF THE INVENTION

The present invention relates to solid zirconium chelates and their use in oil field applications such as hydraulic fracturing and plugging of permeable zones.

BACKGROUND OF THE INVENTION

The production of oil and natural gas from an underground well (subterranean formation) can be stimulated by a technique called hydraulic fracturing, in which a viscous fluid composition (fracturing fluid) containing a suspended proppant (e.g., sand, bauxite) is introduced into an oil or gas well via a conduit, such as tubing or casing, at a flow rate and a pressure which create, reopen and/or extend a fracture into the oil- or gas-containing formation. The proppant is carried into the fracture by the fluid composition and prevents closure of the formation after pressure is released. Leak-off of the fluid composition into the formation is limited by the fluid viscosity of the composition. Fluid viscosity also permits suspension of the proppant in the composition during the fracturing operation. Cross-linking agents, such as borates, titanates or zirconates, are usually incorporated into the fluid composition to control viscosity.

Typically, less than one third of available oil is extracted from a well after it has been fractured before production rates decrease to a point at which recovery becomes uneconomical. Enhanced recovery of oil from such subterranean formations frequently involves attempting to displace the remaining crude oil with a driving fluid, e.g., gas, water, brine, steam, polymer solution, foam, or micellar solution. Ideally, such techniques (commonly called flooding techniques) provide a bank of oil of substantial depth being driven into a producing well; however, in practice this is frequently not the case. Oil-bearing strata are usually heterogeneous, some parts of them being more permeable than others. As a consequence, channeling frequently occurs, so that the driving fluid flows preferentially through permeable zones depleted of oil (so-called "thief zones") rather than through those parts of the strata which contain sufficient oil to make oil-recovery operations profitable.

Difficulties in oil recovery due to thief zones may be corrected by injecting an aqueous solution of an organic polymer and a cross-linking agent into a subterranean formation under conditions where the polymer will be cross-linked to produce a gel, thus reducing permeability of the subterranean formation to the driving fluid (gas, water, etc.). Polysaccharide- or partially hydrolyzed polyacrylamide-based fluids cross-linked with certain aluminum, titanium, zirconium, and boron based compounds are used in these enhanced oil recovery applications. Cross-linked fluids or gels, whether for fracturing a subterranean formation or for reducing permeability of zones in subterranean formation, are now being used in hotter and deeper wells under a variety of temperature and pH conditions. In these operations the rate of cross-linking is critical to the successful generation of viscosity.

Oil field service companies are currently using zirconium or titanium based cross-linkers to generate viscosity in polysaccharide-based fluids useful in hydraulic fracturing, completion and enhanced oil recovery applications. Commercially available, zirconium-based cross-linkers containing an alkanolamine or a hydroxyalkylated ethylenediamine as a chelating ligand cross-link in the desired time and generate and maintain significant viscosity.

For example, U.S. Pat. No. 4,883,605 discloses a water-soluble zirconium chelate formed from a tetraalkyl zirconate and hydroxyethyl-tris-(2-hydroxypropyl)ethylenediamine, and the use of the chelate as a cross-linking agent in hydraulic fracturing fluids and in gels that are used for selectively plugging permeable zones in subterranean formations or for plugging subterranean leaks. Co-pending patent application, "Stable Solutions of Zirconium Hydroxyalkylethylene Diamine Complex and Use in Oil Field Applications," U.S. patent application Ser. No. 11/643,513, filed Dec. 21, 2006, now published as US 2008/0149341 A1, discloses a related complex having a 1:1 molar ratio of zirconium and N,N,N', N'-tetrakis-(2-hydroxypropyl)-ethylenediamine.

These and other existing titanium or zirconium-based cross-linkers such as TYZOR TE organic titanate or TYZOR TEAZ organic zirconate are liquid products which either freeze or become too viscous to pump under cold temperature conditions, e.g., those encountered in underground wells in Canada and the Rocky Mountains. The need exists for solid cross-linkers which can be used to generate high, thermally stable viscosity in a low and/or high pH environment, and which can be used under these cold temperature conditions by pre-blending with the organic polymer, added as a solid to an aqueous polymer solution or dissolved in water and added to the aqueous polymer solution.

The need also exists for solid cross-linkers in off-shore fracturing operations, where the weight of chemicals being shipped and stored is critical. Solid cross-linkers, which contain two or more times the active Ti or Zr content of their liquid counterparts are desired because they would allow fracturing operations to be completed more economically.

The need also exists for solid cross-linkers that are non-flammable. Existing liquid solvent-based zirconate cross-linkers are flammable liquids. Even aqueous-based liquids generally comprise an organic co-solvent, and therefore are also flammable.

The present invention addresses these needs.

SUMMARY OF THE INVENTION

The present invention overcomes problems with liquid cross-linking agents by providing a process to prepare a solid cross-linking agent. The process comprises: (a) contacting a zirconium complex with a hydroxyalkylated ethylenediamine in an alcohol solvent to produce a mixture wherein the mole ratio of hydroxyalkylated ethylenediamine to zirconium is in the range of 0.5:1 to 1.5:1; (b) adding water to the mixture in an amount of 0.1 to 5.2 moles of water per mole of zirconium, preferably 0.5-1.5 moles of water per mole of zirconium; (c) maintaining the product of step (b) for a sufficient period of time for the product to reach equilibrium; and (d) removing the alcohol from the product of step (c) to form a solid zirconium cross-linking agent. In step (c), the temperature is generally from about 25° C. to about 90° C., preferably from 50° C. to 80° C. In step (d), the solvent is preferably removed by evaporation, for example, on a rotary evaporator.

The temperature for evaporation should be below the melting or softening point of the zirconium cross-linking agent, preferably between 50° C. and 80° C. Surprisingly, the process of this invention provides a product which is a solid cross-linking agent rather than a product which is an intractable oil or a viscous gum as frequently occurs upon removal of solvent from a solution of a zirconium or titanium cross-linking agent.

There is further provided a cross-linking composition comprising (a) an aqueous liquid; (b) a buffer; (c) a cross-linkable organic polymer; and (d) a zirconium cross-linking agent, wherein the cross-linking agent is prepared by process comprising (a) contacting a zirconium complex with a hydroxyalkylated ethylenediamine in an alcohol solvent to produce a mixture wherein the mole ratio of hydroxyalkylated ethylenediamine to zirconium is in the range of 0.5:1 to 1.5:1; (b) adding water to the mixture in an amount of 0.1 to 5.2 moles of water per mole of zirconium; (c) maintaining the product of step (b) for a sufficient period of time for the product to reach equilibrium; and (d) removing the alcohol from the product of step (c) to form a solid zirconium cross-linking agent.

There are further provided methods for using the solid zirconium cross-linking agent in a cross-linking composition in oil field applications. Thus, there is provided a method for hydraulically fracturing a subterranean formation comprising introducing into a subterranean formation at a flow rate and pressure sufficient to create, reopen and/or extend a fracture in the formation, (a) an aqueous liquid; (b) a buffer; (c) a cross-linkable organic polymer; and (d) a zirconium cross-linking agent, wherein the cross-linking agent is prepared by process comprising (1) contacting a zirconium complex with a hydroxyalkylated ethylenediamine in an alcohol solvent to produce a mixture wherein the mole ratio of hydroxyalkylated ethylenediamine to zirconium is in the range of 0.5:1 to 1.5:1; (2) adding water to the mixture in an amount of 0.1 to 5.2 moles of water per mole of zirconium; (3) maintaining the product of step (2) for a sufficient period of time for the product to reach equilibrium; and (4) removing the alcohol from the product of step (3) to form a solid zirconium cross-linking agent. The components of the cross-linking composition can be introduced into the formation in any order or combination.

Optionally, the zirconium cross-linking agent is dissolved in a solvent or solution (preferably water) containing optional components to provide a zirconium solution. The cross-linkable organic polymer is also preferably contacted with the aqueous liquid to prepare a base gel. In one particular example, a subterranean formation has a wellbore. The zirconium solution is introduced into the wellbore simultaneously with or sequentially after introducing the base gel into the wellbore. From the wellbore, the combination of base gel and zirconium solution are introduced into the formation.

This invention provides a method for plugging a permeable zone or leak in a subterranean formation which comprises introducing into said zone or said leak, a cross-linked gel wherein the gel comprises (a) an aqueous liquid; (b) a buffer; (c) a cross-linkable organic polymer; and (d) a zirconium cross-linking agent, wherein the cross-linking agent is prepared by a process comprising (1) contacting a zirconium complex with a hydroxyalkylated ethylenediamine in an alcohol solvent to produce a mixture wherein the mole ratio of hydroxyalkylated ethylenediamine to zirconium is in the range of 0.5:1 to 1.5:1; (2) adding water to the mixture in an amount of 0.1 to 5.2 moles of water per mole of zirconium; (3) maintaining the product of step (2) for a sufficient period of time for the product to reach equilibrium; and (4) removing the alcohol from the product of step (3) to form a solid zirconium cross-linking agent.

DETAILED DESCRIPTION OF THE INVENTION

Trademarks and tradenames are shown herein in upper case.

It has been found that a solid zirconium-based cross-linking agent can be produced by the process described herein which comprises preparing a zirconium complex of a chelating ligand at a particular mole ratio of ligand to zirconium in an alcohol solvent and hydrolyzing by adding an amount of water that is in the range of 0.1:1 to 5.2:1 moles of water per mole of zirconium. The solvent is removed, e.g., by vacuum. It has been surprisingly found that a solid, preferably a granular solid, can be prepared by the process described herein in which ratios of ligand to zirconium and water to zirconium are controlled.

The solid zirconium-based cross-linking agent can be used effectively as a cross-linking agent in a cross-linking composition at high or low pH. A cross-linking composition can be prepared by (1) blending the cross-linking agent with a cross-linkable polymer, then adding the blend as a solid to an aqueous liquid; or (2) dissolving the cross-linking agent in a solvent, preferably water, and adding the solution thus prepared to an aqueous liquid. In the latter alternative, the polymer may be pre-dissolved in the aqueous liquid or may be added to the aqueous liquid after the cross-linking agent has been added.

A solid zirconium cross-linking composition is prepared by a process which comprises (a) contacting a zirconium complex with a ligand, which is a hydroxyalkylated ethylenediamine, in an alcohol solvent to produce a mixture wherein the mole ratio of hydroxyalkylated ethylenediamine to zirconium is in the range of 0.5:1 to 1.5:1; (b) adding water to the mixture in an amount of 0.1 to 5.2 moles of water per mole of zirconium; (c) maintaining the product of step (b) for a sufficient period of time for the product to reach equilibrium; and (d) removing the alcohol from the product of step (c) to form a solid zirconium cross-linking agent.

Water is added in an amount of about 1 to 5.2 mole of water per mole of zirconium in order to achieve the desired cross-linking rate by controlling the degree of hydrolysis which occurs. Too much water leads to formation of a viscous oil or a tar or other material form that is difficult to handle (e.g., accurately meter or transfer from one vessel to another) rather than a solid on evaporation of reaction solvent. The hydroxyalkylated ethylenediamine is added in an amount of about 0.5 to 1.5 mole of diamine per mole of zirconium. Optionally a diluent may be added prior to step (c) to act as an anti-caking agent or to aid flowability of the solid.

The mixture produced in step (a), an alcoholic solution of a zirconium complex with hydroxyalkylated ethylenediamine chelating ligand, can be prepared by a process which comprises contacting a solution of a tetraalkyl zirconate in a $C_1$-$C_6$ alcohol with from 0.5 to 1.5 moles molar equivalents of a hydroxyalkylated ethylenediamine per mole of zirconium. Preferably, this ratio is from 0.8 to 1.2 moles molar equivalents of hydroxyalkylated ethylenediamine per mole of zirconium. Surprisingly, outside of these ranges, for example, at a molar ratio of 2 moles of hydroxyalkylated ethylenediamine to zirconium, a solid product does not form.

A number of tetraalkyl zirconates (also known as zirconium tetraalkoxides) can be used to prepare the above zirconium complex, e.g., tetra-isopropyl zirconate, tetra-n-propyl zirconate, and tetra-n-butyl zirconate. The preferred tetraalkyl zirconate is tetra-n-propyl zirconate, available as TYZOR NPZ organic zirconate, a solution in n-propanol, with a zirconium content as $ZrO_2$ of about 28% by weight, and available from E.I. du Pont de Nemours and Company, Wilmington, Del.

Examples of suitable hydroxyalkylated ethylenediamines include, but are not limited to N,N,N',N'-tetrakis-(2-hydroxypropyl)ethylenediamine and N,N,N',N'-tetrakis-(hydroxyethyl)ethylenediamine. N-hydroxyethyl,N,N',N'-tris(2-hydroxypropyl)ethylenediamine, and combinations of two or more thereof will not give solid. Preferably, the hydroxyalkylated ethylenediamine is N,N,N',N'-tetrakis-(2-hydroxypropyl)ethylenediamine or N,N,N',N'-tetrakis-(hydroxyethyl)ethylenediamine. The hydroxyalkylated ethylene diamine, N,N,N',N'-tetrakis-(2-hydroxypropyl)ethylenediamine, is available commercially, for example, from BASF Corporation, Mount Olive, N.J., under the name QUADROL polyol.

Contacting the above tetraalkyl zirconates with the hydroxyalkylated ethylenediamine can be carried out at a variety of temperatures, e.g., between 25° C. and 90° C., preferably between 50° C. and 80° C. The mixture is then held at this temperature for a sufficient period to reach equilibrium. For example, about 4 hours at 60° C. is adequate to reach equilibrium, but other periods and temperatures may also be used. The term "equilibrium" is used to indicate that the reaction between tetraalkyl zirconate and hydroxyalkylated ethylenediamine has gone to completion.

In step (b), the composition resulting from step (a), the alcoholic solution of a zirconium complex with hydroxyalkylated ethylenediamine chelating ligand, is then treated by adding water to the mixture at the rate of about 0.1 to 5.2 mole of water per mole of zirconium. Preferably, this range can be from 0.5 to 1.5 moles of water per mole of zirconium. Surprisingly, outside of these ranges, for example, at a molar ratio of 10 moles of water per mole of zirconium, a solid product does not form.

In step (c), the product of step (b) is maintained at conditions for a sufficient period of time for the product to reach equilibrium. The term "equilibrium" is uses here to indicate that the hydrolysis reaction of water with the product of step (a) has gone to completion. Time will depend on reaction conditions, such as temperature, pressure, mass transfer rates (e.g., depending on intensity of agitation). Thus, the process does not proceed to step (d) until the equilibrium is established. This step (c) can be carried out at a variety of temperatures, e.g., between 25° C. and 90° C., preferably between 50° C. and 80° C., and is then generally held at this temperature for a sufficient period to reach equilibrium. It has been found that holding the composition in step (c) at a temperature of 60° C. for about 4 hours is adequate, but other periods and temperatures may also be used.

In step (d), solvent is removed from the product of step (c), for example by distilling under vacuum, to remove the alcohol. Preferably, the distillation is carried out in a rotary evaporator, graining bowl, or other vacuum device with rotating parts to keep the solid in motion as it solidifies to limit and/or prevent lump formation. Spray drying may also be used in step (d) to remove the solvent. Many types of suitable equipment may be used, as are well known to those skilled in the art. The solution may also be simply dried in air, although for environmental reasons this is not a method of choice. The temperature of drying should be below the melting or softening point of the zirconium complex. Preferably, the temperature is between 50° C. and 80° C.

Preferably, a diluent is added to the solid cross-linking agent. A diluent may be added to the product of step (c) or to the solid after step (d). The diluent can be any material which may enhance properties of the solid, and does not adversely affect the solid or its use as a crosslinking agent. A diluent is added for such purposes as to help in the crystallization step, increase the crystallinity of the solid particles, provide an anti-caking action, improve the flowability of the solid material, enable easier solution of the solids in water, improve product stability, or for other purposes.

For example, the diluent may be a salt or metal oxide. The diluent may be selected from the group consisting of potassium chloride, tetramethylammonium hydroxide, titanium dioxide and silicon dioxide. Potassium chloride and tetramethylammonium hydroxide, for example, make the solid easier to remove from the drying unit than undiluted solids. The resulting solids are also more free-flowing and hence much more easily handled in the field. Insoluble inert compounds such as titanium dioxide and silicon dioxide may also be used to improve handling, and may be added before or after the drying step (d).

The present invention also provides a cross-linking composition which comprises (a) an aqueous liquid; (b) a pH buffer; (c) a cross-linkable organic polymer; and (d) a zirconium cross-linking agent as prepared according to the process described above. Optionally, the composition may comprise a solvent.

The aqueous liquid (a) is typically selected from the group consisting of water, aqueous alcohol, and aqueous solution of a clay stabilizer. The alcohol is methanol or ethanol. Clay stabilizers include, for example, hydrochloric acid and chloride salts, such as, tetramethylammonium chloride (TMAC) or potassium chloride. Aqueous solutions comprising clay stabilizers may comprise, for example, 0.05 to 0.5 weight % of the stabilizer, based on the total weight of the cross-linking composition. Preferably, the clay stabilizer is tetramethylammonium chloride or potassium chloride. Preferably, the aqueous liquid is water, aqueous methanol, aqueous ethanol, an aqueous solution of potassium chloride, or a combination of two or more thereof.

The cross-linking composition comprises an effective amount of a pH buffer (b) to control pH. The pH buffer may be acidic, neutral or basic. The pH buffer is generally capable of controlling the pH from about pH 3 to about pH 12. For example, in a composition for use at pH of about 4-5, an acetic acid-based buffer can be used. In a composition for use at a pH of 5-7, a fumaric acid-based buffer or a sodium diacetate-based buffer can be used. In a composition for use at a pH of 7-8.5, a sodium bicarbonate-based buffer can be used. In a composition for use at a pH of 9-12, a sodium carbonate or sodium hydroxide-based buffer can be used. Other suitable pH buffers can be used, as are known to those skilled in the art.

The composition further comprises a cross-linkable organic polymer (c). Suitable cross-linkable organic polymers are selected from the group consisting of solvatable polysaccharides, polyacrylamides and polymethacrylamides. Preferably, the organic polymer is a solvatable polysaccharide and is selected from the group consisting of gums, gum derivatives and cellulose derivatives. Gums include guar gum and locust bean gum, as well as other galactomannan and glucomannan gums, such as those derived from sennas, Brazilwood, tera, honey locust, karaya gum and the like. Gum derivatives include hydroxyethylguar (HEG), hydroxypropylguar (HPG), carboxyethylhydroxyethylguar (CEHEG), carboxymethylhydroxypropylguar (CMHPG), carboxymethyl guar (CMG), and the like. Cellulose derivatives include those containing carboxyl groups, such as carboxymethylcellulose (CMC), carboxymethylhydroxy-ethylcellulose (CMHEC), and the like. The solvatable polysaccharides can be used individually or in combination; usually, however, a single material is used. Guar derivatives and cellulose derivatives are preferred, such as, HPG, CMC and CMHPG. HPG is generally more preferred based upon its commercial availability and desirable properties. However, CMC and CMHPG may be more preferred in cross-linking compositions when the pH of the composition is less than 6.0 or higher than 9.0, or when the permeability of the formation is such that one wishes to keep the residual solids at a low level to prevent damage to the formation.

The zirconium cross-linking agent (d) is the solid zirconium product described previously, and made by a method comprising: (a) contacting a zirconium complex with a hydroxyalkylated ethylenediamine in an alcohol solvent to produce a mixture wherein the mole ratio of hydroxyalkylated ethylenediamine to zirconium is in the range of 0.5:1 to 1.5:1; (b) adding water to the mixture in an amount of 0.1 to 5.2 moles of water per mole of zirconium; (c) maintaining the product of step (b) for a sufficient period of time for the product to reach equilibrium; and (d) removing the alcohol from the product of step (c).

The zirconium cross-linking agent of the invention can be added dissolved (in solution), preferably dissolved in water, or as a solid. The solid cross-linking agent can be pre-blended with the solid polymer prior to dissolving both the solid cross-linking agent and solid polymer in the aqueous liquid. Alternatively, the solid zirconium cross-linking agent can be added to the aqueous liquid as a solid or in solution, before or after addition of the polymer. Typically, the cross-linkable polymer is mixed with the aqueous liquid such as water or mixed water/organic solvent or with an aqueous solution to form a base gel prior to adding the zirconium cross-linking agent. Organic solvents that may be used include alcohols, glycols, polyols, and hydrocarbons such as diesel.

The composition may comprise optional components, including those which are common additives for oil field applications. Thus, the composition may further comprise one or more of proppants, friction reducers, bactericides, hydrocarbons, chemical breakers, polymer stabilizers, surfactants, formation control agents, and the like. Proppants include sand, bauxite, glass beads, nylon pellets, aluminum pellets and similar materials. Friction reducers include polyacrylamides. Hydrocarbons include diesel oil. Chemical breakers break the cross-linked polymer (gel) in a controlled manner and include enzymes, alkali metal persulfate, and ammonium persulfate. Polymer stabilizers include methanol, alkali metal thiosulfate, and ammonium thiosulfate.

These optional components are added in an effective amount sufficient to achieve the desired cross-linking performance based on the individual components, desired cross-linking time, temperature and other conditions present in the formation being fractured or permeable zone being plugged.

The cross-linking composition is produced by mixing the solid or solution of zirconium cross-linking agent with the other components, in any order. A solution of zirconium cross-linking agent (zirconium solution) can be prepared by dissolving the solid zirconium cross-linking agent in an appropriate solvent or solution containing other components. Suitable solvents include water, water-alcohol mixtures, and alcohol wherein alcohol is methanol or ethanol. Preferably, the solvent is water. A solution containing other components may be an aqueous solution or an alcohol solution. Other components may include, for example, buffer, clay stabilizers, other optional components.

For example, in one particular application in an oil field, an aqueous solution of zirconium cross-linking agent and optional components are introduced into a formation, while the cross-linkable organic polymer and aqueous liquid are introduced into the formation as a combined separate stream. Alternatively, all components may be premixed and introduced into a subterranean formation as a single stream. Advantageously, the components may be mixed in different combinations, and more advantageously, the components may be mixed just prior to use to enable easy variation and adjustment of the cross-linking rate.

This invention provides a method for hydraulically fracturing a subterranean formation, which comprises introducing into the formation at a flow rate and pressure sufficient to create, reopen, and/or extend one or more fractures in the formation, a cross-linking composition which comprises (a) an aqueous liquid; (b) a pH buffer; (c) a cross-linkable organic polymer; and (d) a zirconium cross-linking agent wherein the cross-linking agent is prepared by a process comprising: (1) contacting a zirconium complex with a hydroxyalkylated ethylenediamine in an alcohol solvent to produce a mixture wherein the mole ratio of hydroxyalkylated ethylenediamine to zirconium is in the range of 0.5:1 to 1.5:1; (2) adding water to the mixture in an amount of 0.1 to 5.2 moles of water per mole of zirconium; (3) maintaining the product of step (2) for a sufficient period of time for the product to reach equilibrium; and (4) removing the alcohol from the product of step (3).

In one embodiment of the method for hydraulically fracturing a subterranean formation, a solution of the solid zirconium cross-linking agent and cross-linkable polymer are contacted prior to their introduction into the formation, such that the cross-linking agent and polymer react to form a cross-linked gel. The cross-linked gel is then introduced into the formation at a flow rate and pressure sufficient to create, reopen, and/or extend a fracture in the formation. In this method, a base gel is prepared by mixing a cross-linkable organic polymer with an aqueous liquid. A cross-linked gel is prepared by mixing the base gel with a solution of the solid zirconium cross-linking agent, wherein the cross-linking agent is prepared by a process comprising: (a) contacting a zirconium complex with a hydroxyalkylated ethylenediamine in an alcohol solvent to produce a mixture wherein the mole ratio of hydroxyalkylated ethylenediamine to zirconium is in the range of 0.5:1 to 1.5:1; (b) adding water to the mixture in an amount of 0.1 to 5.2 moles of water per mole of zirconium; (c) maintaining the product of step (b) for a sufficient period of time for the product to reach equilibrium; and (d) removing the alcohol from the product of step (c). The solution of the solid zirconium cross-linking agent is preferably prepared by dissolving the solid agent in water. At least one of the solutions of zirconium cross-linking agent or the base gel further comprises a pH buffer.

Alternatively, the subterranean formation may be penetrated by a wellbore, such that contacting the solution of zirconium cross-linking agent with the base gel occurs in the wellbore and the cross-linked gel is introduced into the formation from the wellbore. This method of hydraulically fracturing a subterranean formation penetrated by a wellbore comprises (a) preparing a base gel by mixing a cross-linkable organic polymer with an aqueous liquid; (c) introducing the base gel into the wellbore; (d) simultaneously with or sequentially after introducing the base gel into the wellbore, introducing a solution of the solid zirconium cross-linking agent; (e) permitting the base gel and the solution of zirconium cross-linking agent to react to form a cross-linked gel; and (f) introducing the cross-linked gel into the formation from the wellbore at a flow rate and pressure sufficient to create, reopen, and/or extend a fracture in the formation. A pH buffer is independently admixed with the base gel, the zirconium or both prior to introducing the base gel and the zirconium solution into the wellbore.

Upon creation of a fracture or fractures, the method may further comprise introducing a cross-linking composition comprising the zirconium solution, a cross-linkable organic polymer and proppant into the fracture or fractures. This second introduction of the zirconium solution is preferably performed in the event the cross-linking composition used to create the fracture or fractures did not comprise proppant.

Another use for the zirconium cross-linking agent of the present invention relates to a method for selectively plugging permeable zones and leaks in subterranean formations, which comprises introducing into the permeable zone or the site of the subterranean leak, a cross-linking composition comprising (a) an aqueous liquid; (b) a pH buffer; (c) a cross-linkable organic polymer; and (d) an aqueous solution of a solid zirconium cross-linking agent as described previously. The pH buffer may be admixed with the solution of zirconium cross-linking agent prior to introducing the cross-linking composition into the permeable zone or site of the leak.

In a first embodiment of the method for plugging a permeable zone or a leak in a subterranean formation, the aqueous liquid, pH buffer, cross-linkable organic polymer and the zirconium solution are contacted prior to their introduction into the subterranean formation, such that the polymer and zirconium cross-linking agent react to form a cross-linked aqueous gel, which gel is then introduced into the formation.

In an alternative embodiment of the method for plugging a permeable zone or a leak in a subterranean formation, the zirconium solution and the cross-linkable organic polymer are introduced separately, either simultaneously or sequentially, into the permeable zone or the site of the subterranean leak such that cross-linking occurs within the subterranean formation. This method comprises (a) preparing a base gel by mixing a cross-linkable organic polymer with an aqueous liquid; (b) introducing the base gel into the into the permeable zone or the site of the subterranean leak, (d) simultaneously with or sequentially after, introducing the base gel into the into the permeable zone or the site of the subterranean leak, introducing the zirconium solution into the permeable zone or the site of the subterranean leak; (e) permitting the base gel and the cross-linking agent to react to form a cross-linked aqueous gel to plug the zone and/or leak. At least one of the solutions of zirconium cross-linking agent or the base gel further comprises a pH buffer.

The relative amounts of cross-linkable organic polymer and the zirconium complex may vary. One uses small but effective amounts which for both will vary with the conditions, e.g., the type of subterranean formation, the depth at which the method (e.g., fluid fracturing, permeable zone plugging or leak plugging) is to be performed, temperature, pH, etc. Generally one uses as small an amount of each component as will provide the viscosity level necessary to effect the desired result, i.e., fracturing of the subterranean formation, or plugging permeable zones or leaks to the extent necessary to promote adequate recovery of oil or gas from the formation.

For example, satisfactory gels can generally be made for fluid fracturing by using the cross-linkable organic polymer in amounts up to about 1.2 weight % and the cross-linking composition in amounts up to about 0.50 weight % of the zirconium cross-linking agent, with percentages being based on the total weight. Preferably, from about 0.25 to about 0.75 weight % of the cross-linkable organic polymer is used and from about 0.05 to about 0.25 weight % of the zirconium cross-linking agent is used.

In a method for plugging permeable zones or leaks, generally about 0.25 to 1.2 weight % of a cross-linkable organic polymer is used, preferably 0.40 to 0.75 weight %, based on the total weight. Generally, about 0.01 to 0.50 weight % of the zirconium cross-linking agent is used, preferably 0.05 to 0.25 weight %, based on the total weight.

The amount of zirconium cross-linking agent used to cross-link the organic polymer is that which provides a zirconium ion concentration in a range from about 0.0005 weight % to about 0.1 weight %, based on the total weight. The preferred concentration of zirconium ion is in the range of from about 0.001-0.05 weight %, based on the total weight.

Typically, the solution of zirconium cross-linking agent of this invention can be used at a pH of from about 3 to 11. For low temperature applications (150-250° F., 66-121° C.), carbon dioxide-based energized fluids may be used. In this case, a pH for the cross-linking composition of about 3 to about 6 is preferred. For moderate or high temperature applications (250-400° F., 121-204° C.), a pH of about 9 to about 11 is preferred. Advantageously, the solution of zirconium complex of this invention is used at a temperature of 250-300° F. (121-149° C.).

EXAMPLES

The preparation of the compositions in the Examples and in the Controls were each carried out in closed vessels containing an agitator, thermometer, condenser, nitrogen inlet and dropping funnel. Unless specified otherwise, percentages are given by weight. Temperatures are given in degrees Celsius. The cross-linking properties of the compositions of this invention are given in the Examples as a function of the viscosity, in centipoise, Cp, of carboxymethylhydroxypropylguar cross-linked with the zirconate of this invention.

Preparation of Base Gel

A Waring blender jar was filled with 1 liter of distilled water. To this was added 2 g of a 50% aqueous solution of tetramethylammonium chloride clay stabilizer. Agitation was started and 3.6 g of carboxymethylhydroxypropylguar (CM-HPG) was sprinkled into the vortex of the agitating solution. The pH of the resultant slurry was adjusted to 6 with sodium diacetate and agitation continued for 30 minutes. The pH was then adjusted to 10.3 with 10% sodium hydroxide solution. Agitation was stopped and the gel was allowed to stand for 30 minutes or more before use.

Viscosity Measurement of Zirconate Cross-Linked Base Gel

To 250 ml of a vigorously agitated sample of base gel in a Waring blender jar, was added 0.00032 moles of zirconium (0.2-1.0 ml depending on percent zirconium in the solid cross-linking agent—hereinafter referred to as the Standard Loading Density). Agitation was continued for about 15-180 seconds. A 25 ml sample of the cross-linker containing gel was placed in the cup of the FANN 50 Viscometer with an R-1, B-3 configuration and viscosity was measured at 275° F. (135° C.) and 122 rpm at 100 reciprocal seconds of shear.

Comparative Example A

Triethanolamine (135.2 g) was added to 100 g of tetra-n-propyl zirconate solution (TYZOR NPZ organic zirconate, available from E.I. du Pont de Nemours and Company, Wilmington, Del.). The reaction mixture was heated to 60° C. and held there for 4 hours. Upon completion of the reaction the resultant solution of tetra(triethanolamine) zirconate was concentrated on a rotary evaporator under reduced pressure to yield 155 g of a viscous yellow oil, which contained 13.2% zirconium. This material was placed in a 32° F. (0° C.) freezer, which resulted in the material setting up as an immobile gummy solid.

Comparative Example B

This Comparative Example illustrates that preparing a zirconium triethanolamine cross-linking agent according to the process of this invention does not produce a solid cross-linking agent.

A 500-ml flask equipped with agitator, reflux condenser, $N_2$ source and agitator was charged with 100 g (0.227 moles) of tetra-n-propyl zirconate solution (TYZOR NPZ organic zirconate). Agitation was started and 67.6 g (0.454 moles) of triethanolamine were added dropwise. The reaction mixture was heated to 60° C. and held at this temperature for 2 hours. Then, a mixture glycerol, 20.9 g (0.227 moles), and water, 4.1 g (0.227 moles) was added dropwise to the reaction mixture to provide a solution. The solution was held at 60° C. for an additional 2 hours, and then the solvent removed on a rotary evaporator to give 124.8 g of a viscous yellow oil.

Comparative Example C

This Comparative Example illustrates a molar ratio of 8:1 for TEA to Zr is ineffective for producing a solid product.

A 500-ml flask equipped with agitator, reflux condenser, $N_2$ source and agitator was charged with 100 g (0.227 moles) of tetra-n-propyl zirconate solution (TYZOR NPZ organic zirconate). Agitation was started and 270.3 g (1.816 moles) of triethanolamine were added dropwise. The reaction mixture was heated to 60° C. and held at this temperature for 2 hours. Then, the solvent removed on a rotary evaporator to give 324.6 g of a viscous yellow oil.

Comparative Example D

This Comparative Example illustrates that preparing an alternative zirconium triethanolamine cross-linking agent according to the process of this invention does not produce a solid cross-linking agent.

A 1000-ml flask equipped with agitator, reflux condenser, $N_2$ source and agitator was charged with 10.0 ml (0.0227 moles) of tetra-n-propyl zirconate solution (TYZOR NPZ organic zirconate). Agitation was started and 20.0 ml (0.122 moles) of triethanolamine were added dropwise. The reaction mixture was heated to 60° C. and held at this temperature for 2 hours. Then, a mixture of 30.0 ml of n-propanol and 540 ml of water was added. The solvent was removed on a rotary evaporator to give 24.2 g of a viscous yellow oil.

Comparative Examples A through D show that simply removing solvent from a solvent-based zirconium complex, which can be used as a cross-linking agent, as described in the patent literature, does not yield a solid that can be readily and easily handled for measuring and/or metering into a cross-linking composition. Comparative Example A was a gummy solid. Comparative Examples B through D were viscous oils.

Comparative Example E

A 500-ml flask, equipped with a thermocouple, dropping funnel, $N_2$ bleed and condenser was charged with 100 g of TYZOR NPZ organic zirconate. Agitation was started and 66.3 g of QUADROL polyol (available from BASF Corporation, Mount Olive, N.J.) were added. The resulting solution was held at 60° C. for 4 hours, after which time 40 g of water were added. The reaction mass was held at 60° C. for an additional 4 hours. The resulting slurry was placed on a rotary evaporator and the solvent removed under vacuum to give 96.5 g of a gummy yellow glass.

This Comparative Example shows that 10 moles of water per mole of zirconium does not give a solid material.

Comparative Example F

A 500-ml flask, equipped with a thermocouple, dropping funnel, $N_2$ bleed and condenser was charged with 100 g of TYZOR NPZ organic zirconate. Agitation was started and 132.6 g of QUADROL polyol (available from BASF) were added. The resulting solution was held at 60° C. for 4 hours, after which time 4 g of water were added. The reaction mass was held at 60° C. for an additional 4 hours. This resulting slurry was placed on a rotary evaporator and the solvent removed under vacuum to give 156.7 g of a viscous yellow oil.

This Example shows that a 2:1 molar ratio of hydroxyalkylated ethylene diamine (QUADROL polyol) to zirconium does not give a solid material.

Example 1

A 1000-ml flask, equipped with a thermocouple, dropping funnel, $N_2$ bleed and condenser was charged with 352.4 g of TYZOR NPZ organic zirconate. Agitation was started and 233.6 g of QUADROL polyol (available from BASF) were added. The resultant solution was held at 60° C. for 4 hours, after which time 14.4 g of water were added. The reaction mass was held at 60° C. for an additional 4 hours. The resultant slurry was placed on a rotary evaporator and the solvent removed under vacuum to give 164.4 g of a pale yellow solid containing 22.2% of zirconium.

Example 2

A 500-ml flask, equipped with a thermocouple, dropping funnel, $N_2$ bleed and condenser was charged with 220.3 g of TYZOR NPZ organic zirconate. Agitation was started and 118 g of tetrahydroxyethyl ethylenediamine (THEED, available from TOMEN Chemical Co., Tokyo, Japan.) were added. The resulting solution was held at 60° C. for 4 hours, after which time 9 g of water were added. The reaction mass was held at 60° C. for an additional 4 hours. The resultant slurry was placed on a rotary evaporator and the solvent removed under vacuum to give 161.6 g of a pale yellow solid containing 28.2% of zirconium.

Example 3

A 500 ml-flask, equipped with a thermocouple, dropping funnel, $N_2$ bleed and condenser was charged with 110.2 g of TYZOR NPZ organic zirconate. Agitation was started and 59 g of THEED were added. The resultant solution was held at 60° C. for 4 hours, after which time 4.5 g of water were added. The reaction mass was held at 60° C. for an additional 4 hours and then 81 g of tetramethylammonium chloride (TMAC) were added. The resultant slurry was placed on a rotary evaporator and the solvent removed under vacuum to give 161.6 g of a pale yellow solid containing 14.1% of zirconium.

Example 4

A 500-ml flask, equipped with a thermocouple, dropping funnel, $N_2$ bleed and condenser was charged with 110.2 g of TYZOR NPZ organic zirconate. Agitation was started and 59 g of THEED were added. The resulting solution was held at 60° C. for 4 hours, after which time 4.5 g of water were added. The reaction mass was held at 60° C. an additional 4 hours and then 81 g of potassium chloride were added. The resulting slurry was placed on a rotary evaporator and the solvent removed under vacuum to give 161.6 g of a pale yellow solid containing 14.1% of zirconium.

RESULTS

Table 1 below shows the performance of a 30 lb/1000 gallon (3600 g/1000 liters) CMHPG gel cross-linked with the zirconium products of the Examples. In this table, "Fann Time Max, min." means the time, in minutes, it takes to reach maximum viscosity. The viscosity at this maximum time is labeled "Cp @ Max.", to indicate viscosity in centipoise (Cp) and the viscosity after 90 minutes at the test temperature of 275° F. (135° C.) is labeled "Cp @ 90 min.". The solid zirconate cross-linking agent was added to the pre-formed polymer base gel as a solid. The zirconium cross-linking agent of Comparative Example A was warmed to lower viscosity and added as a viscous liquid.

TABLE 1

Comparative Performance vs. Controls and Temperature

| Example | Physical state at 0° C. | % Zr | Zr, moles | Diamine, moles | Diluent | Fann Time Max., min. | Cp @ Max. | Cp @ 90 min. |
|---|---|---|---|---|---|---|---|---|
| Comparison Example A | Gummy liquid | 13.2 | | | | 1.5 | 1125 | 680 |
| Example 1 | Solid | 22.4 | 1 | QUADROL, 1 | | 7.5 | 480 | 255 |
| Example 2 | Solid | 27.5 | 1 | THEED, 1 | | 12.5 | 360 | 120 |
| Example 3 | Granular Solid | 14.1 | 1 | THEED, 1 | TMAC | 10.5 | 488 | 265 |
| Example 4 | Granular solid | 12 | 1 | THEED, 1 | KCl | 11 | 398 | 222 |

Table 1 shows that, under cold storage conditions, 0° C., the products of Examples 1-4 are solids, while the product of Comparative Example A is a gummy solid. Addition of a diluent such as tetramethylammonium chloride (Example 3) or potassium chloride (Example 4) improves the granular nature of the solid relative to the product of Example 2. The rates of cross-linking for Examples 1 and 2 are also much slower than that of Comparison A. However, the rate for Example 1 is within the desired range for use in high temperature fracturing fluids and that for Example 2 is within the range desired for use in enhanced oil recovery applications. Although viscosity generation is less effective for each of the Examples relative to Comparative Example A, the viscosity is sufficient to allow completion of the desired applications.

What is claimed is:

1. A method for hydraulically fracturing a subterranean formation comprising introducing into a subterranean formation at a flow rate and pressure sufficient to create, reopen and/or extend a fracture in the formation, (a) an aqueous liquid; (b) a buffer; (c) a cross-linkable organic polymer; and (d) a solid zirconium-hydroxylated ethylenediamine cross-linking agent.

2. The method of claim 1 wherein the aqueous liquid, the buffer, the cross-linkable organic polymer, and the zirconium cross-linking agent are premixed and introduced into the subterranean formation as a single stream.

3. The method of claim 1 wherein the subterranean formation is penetrated by a wellbore; the cross-linkable organic polymer and aqueous liquid are contacted to form a base gel; the zirconium cross-linking agent is dissolved in a solvent or solution containing other components to provide a zirconium solution; and wherein the method comprises introducing the base gel into the wellbore and/or formation; introducing the zirconium solution into the wellbore and/or formation simultaneously with or sequentially after introducing the base gel into the wellbore and/or formation; and permitting the base gel and the zirconium solution to react to form a cross-linked gel in situ within the wellbore and/or formation.

4. The method of claim 3 wherein the zirconium cross-linking agent is dissolved in water.

5. The method of claim 3 further comprising introducing proppant into the wellbore and/or formation.

6. The method of claim 5 wherein the proppant comprises sand, bauxite, glass beads, nylon pellets, or aluminium pellets.

7. The method of claim 1 further comprising introducing friction reducers, bactericides, hydrocarbons, chemical breakers, a polymer stabilizers, surfactants, or formation control agents.

8. The method of d claim 7 wherein the friction reducers comprise polyamides.

9. The method of claim 7 wherein the chemical breakers comprise enzymes, alkali metal persulfate, or ammonium persulfate.

10. The method of claim 7 wherein the polymer stabilizers comprise methanol, alkali metal thiosulfate, or ammonium thiosulfate.

11. The method of claim 1 wherein the solid zirconium-hydroxylated ethylenediamine cross-linking agent is used at a pH of from about 3 to 11.

12. The method of claim 1 wherein the subterranean formation has a temperature of from about 150° F. to about 250° F.

13. The method of claim 1 further comprising introducing to the subterranean formation carbon dioxide-based energized fluid.

14. The method of claim 3 wherein the solid zirconium-hydroxylated ethylenediamine cross linking agent is present in an amount sufficient to provide a zirconium ion concentration of from about 0.0005 wt. % to about 0.1 wt. % based on the total weight of the crosslinked gel.

15. A method for plugging a permeable zone or leak in a subterranean formation comprising introducing into said zone or said leak, (a) an aqueous liquid; (b) a buffer; (c) a cross-linkable organic polymer; and (d) a solid zirconium cross-linking agent, wherein the cross-linking agent is prepared by process comprising (1) contacting a zirconium complex with a hydroxyalkylated ethylenediamine in an alcohol solvent to produce a mixture wherein the mole ratio of hydroxyalkylated ethylenediamine to zirconium is in the range of 0.5:1 to 1.5:1; (2) adding water to the mixture in an amount of 0.1 to 5.2 moles of water per mole of zirconium; (3) maintaining the product of step (2) for a sufficient period of time for the product to reach equilibrium; and (4) removing the alcohol from the product of step (3) to form a solid zirconium cross-linking agent.

16. The method of claim 15 wherein the aqueous liquid, pH buffer, cross-linkable organic polymer; and solution of zirconium complex are contacted prior to their introduction into the subterranean formation.

17. The method of claim 15 wherein the subterranean formation is penetrated by a wellbore; the zirconium cross-linking agent is dissolved in a solvent or solution containing other components to provide a zirconium solution; and contacting of the zirconium solution with the aqueous liquid and the cross-linkable organic polymer occurs in the wellbore and/or formation.

18. The method of claim 15 wherein the solid zirconium cross linking agent is present in an amount sufficient to provide a zirconium ion concentration of from about 0.0005 wt. % to about 0.1 wt. % based on the total weight of the crosslinked gel.

19. The method of claim 15 wherein the solid zirconium cross-linking agent is used at a pH of from about 3 to 11.

20. The method of claim 1 wherein the subterranean formation has a temperature of from about 250° F. to about 400° F. and a pH of from about 9 to about 11.

* * * * *